(No Model.) 2 Sheets—Sheet 1.
S. E. CLARKSON.
COMBINED FERTILIZER DISTRIBUTER AND SEEDER.
No. 448,010. Patented Mar. 10, 1891.
Fig. 1.
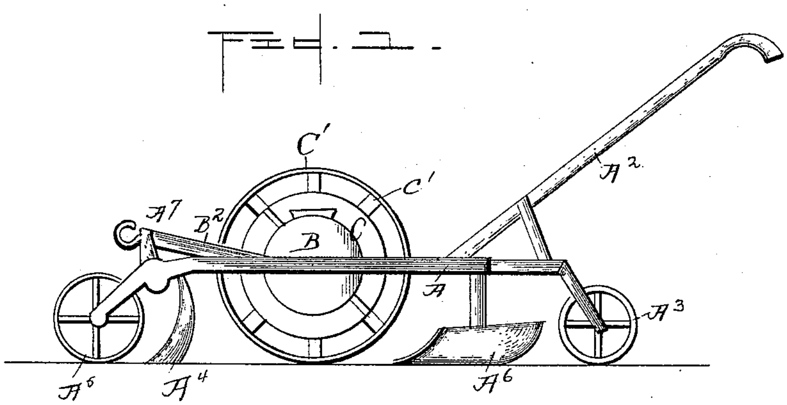
Fig. 2.
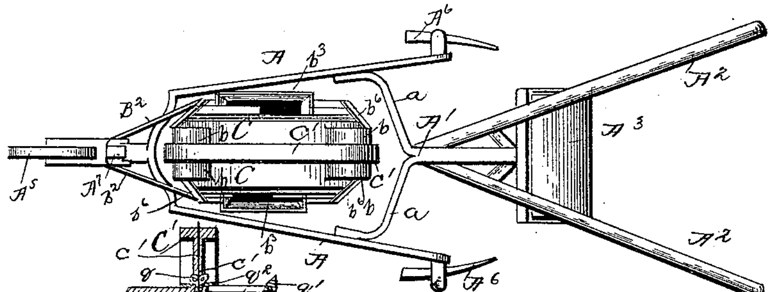
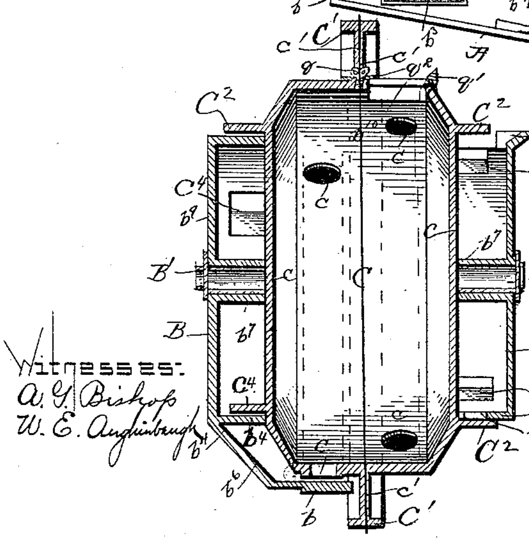
Fig. 4.
Witnesses:
A. G. Bishop
W. E. Aughinbaugh
Inventor:
Samuel E. Clarkson
by his Attorney
J. B. Lawyer
THE NORRIS PETERS CO., PHOTO-LITHO., WASHINGTON, D. C.

(No Model.) 2 Sheets—Sheet 2.

S. E. CLARKSON.

COMBINED FERTILIZER DISTRIBUTER AND SEEDER.

No. 448,010. Patented Mar. 10, 1891.

Witnesses:
Al Bishop
W E Aughinbaugh

Inventors:
Samuel E. Clarkson
by his Attorney
J.B. Lawyer

THE NORRIS PETERS CO., PHOTO-LITHO., WASHINGTON, D. C.

UNITED STATES PATENT OFFICE.

SAMUEL ELLISON CLARKSON, OF PHILADELPHIA, PENNSYLVANIA.

COMBINED FERTILIZER-DISTRIBUTER AND SEEDER.

SPECIFICATION forming part of Letters Patent No. 448,010, dated March 10, 1891.

Application filed June 25, 1890. Serial No. 356,652. (No model.)

*To all whom it may concern:*

Be it known that I, SAMUEL ELLISON CLARKSON, a citizen of the United States, residing at Philadelphia, in the county of Philadelphia and State of Pennsylvania, have invented certain new and useful Improvements in a Combined Fertilizer-Distributer and Seeder; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention consists in the combination, with a revolving drum-carrying fertilizer, of fixed hoppers on the sides thereof carrying seed, the said drum and hoppers being mounted on a suitable frame carrying trench-openers and covering-shovels and having apertures adapted to be opened and closed by the rotation of the said drum; and it also consists in the combination, construction, and arrangement of the several parts of which it is composed, as will be hereinafter more fully described and claimed.

Figure 3:
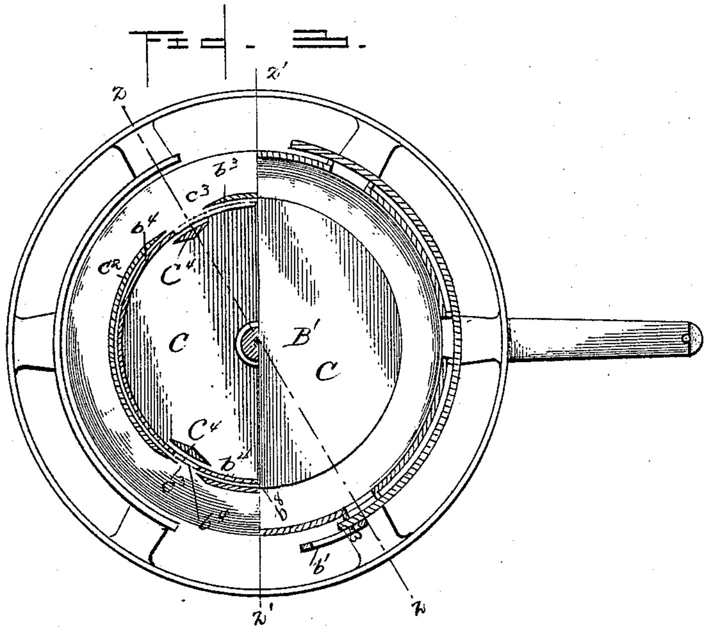
Figure 5:
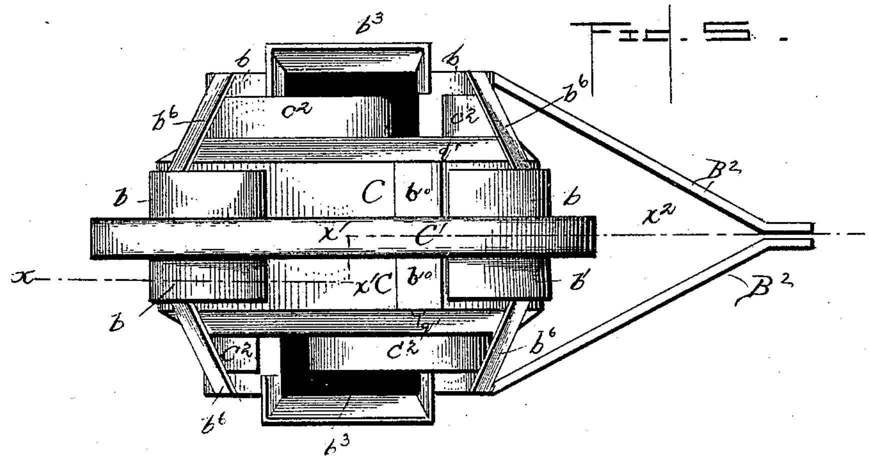

Referring to the accompanying drawings, in which corresponding parts are designated by similar letters, Figure 1 is a side view of a machine constructed according to my invention. Fig. 2 is a plan view thereof. Fig. 3 is a vertical longitudinal section of the fertilizer-distributer and seeder removed from its supporting-frame, and is taken on line $x$ $x'$ $x^2$ of Fig. 5. Fig. 4 is a vertical transverse section of the parts illustrated in Fig. 3 and has its opposite sides taken on the lines $z$ $z$ and $z'$ $z'$ thereof. Fig. 5 is a plan view of the parts shown in Figs. 3 and 4.

The frame-work may be of any approved construction; but by preference I use a frame-work of the following construction: The two side bars A A converge toward their forward ends, while a center bar A′ runs midway between them, but does not extend to the forward end of the frame-work, it having its forward end connected with the side bars A by braces $a$, and carries the handles $A^2$ of the plow frame-work, and also the roller $A^3$. A furrow-opener $A^4$ depends from the forward end of the frame-work, but in the rear of the wheel $A^5$, while covering-shovels $A^6$ depend from the rear of the side bars A A and serve to throw the earth back into the furrow formed by the opener $A^4$ after the seed has been deposited therein.

The hoppers B are placed on both sides of the fertilizing-drum C, the bearings B′, projecting from the sides of the drum, being received by the transverse apertures in the hoppers, the bearings B′ thus serving as an axle for the drum around which it revolves. The hoppers B are each secured to the goose-neck $A^7$ by independent links $B^2$, which are pivotally secured to the latter, thus permitting a vertical movement of the hoppers, in order that the rim C′ of the drum may be constantly upon the ground, so that in the movement of the frame (the hoppers being contained between the forward ends of the side bars A A) the drum will be rotated by its friction upon the ground.

The drum C has a series of perforations or apertures $c$ on each side of its center and has a central peripheral rim or flange C′, supported on spokes $c'$, while each of the hoppers B has an inwardly-projecting arc-shaped flange $b$ on its forward and on its rear faces, an opening being left between the top or upper ends of the front and rear flanges in order to permit the charging of the drum, while a similar opening is left at the bottom, but is adapted to be partly closed by the adjustable apron $b'$, whereby the amount of fertilizer deposited may be governed. As will be seen from an inspection of Fig. 4, the flanges $b$ project sufficiently from the hoppers to cover the apertures $c$ in the drum. An annular flange $C^2$ is formed upon each side of the drum at such a distance from the bearings B′ as to revolve upon the outside of the circular hoppers B, the said flanges having openings $c^3$ therein, opposite which are the projections $C^4$, the said projections being upon the sides of the drum C at such a distance from the bearings B′ as to revolve within the circular walls $b^4$ of the hoppers B, while the flanges $C^2$ revolve upon the outside thereof.

The hoppers B are circular in longitudinal vertical section and have flared mouths $b^3$ projecting from their tops outwardly and have no inner walls, the sides $c^4$ of the drum C serving to retain the seed contained therein, while the annular flanges $b$ are supported by arms $b^6$, projecting from the peripheral walls $b^4$ thereof. It will also be seen from an inspection of the drawings that the bearings $B'$ of the drum are supported in an inward extension $b^7$ of the outer walls $b^9$ of the hoppers B. The fertilizer may be introduced into the drum through the door $b^{10}$, which may be afterward secured in place in any approved manner, although I prefer the following construction: The doors $b^{10}$ are pivoted to the outer side of the drum upon the sides thereof and are locked in place by the thumb-screw $q$ working upon the washer $q^2$, the screw and washer being located under the rim $C'$, the doors being prevented from opening too far by the lugs $q'$, formed upon the outside thereof.

The hoppers being filled with seed and the drum with fertilizer, the operation of my invention is as follows: The frame-work being drawn forward, the opener $A^4$ will make a furrow, while the same movement will cause a rotation of the drum. In this rotation the apertures $c$ will pass successively above the opening between the lower ends of the arc-shaped flanges $b$, and being thus uncovered will feed a certain quantity of fertilizer upon each side of the center of the furrow. The revolution of the drum will also cause the openings $c^3$ in the annular flanges $C^2$ to register with the apertures $b^8$ in the base of the hoppers B, thereby permitting a certain amount of corn to be fed downward therefrom, and at the time the said apertures and openings $b^8$ and $c^3$ register with each other the projections $C^4$ (which have sharpened edges) will obstruct the inner ends of the apertures $b^8$, and thus prevent more seed than may be contained within the aperture itself from being fed. Upon the further rotation of the drum the projections $C^4$ will uncover the inner openings of the apertures $b^8$, while the outer openings thereof will be closed by the annular flange $C^3$. It will also be seen that as the seed is fed downward on both sides of the furrow the fertilizer will be thrown in the furrow and covered by the shovels $A^6$.

Having thus described my invention, what I claim, and desire to secure by Letters Patent, is—

1. The combination, with a revolving drum, of a hopper on each side thereof forming supports for the said drum, and annular flanges projecting inward from each of the said hoppers and having an opening between their lower ends, as described.

2. The combination, with an apertured revolving drum, of a rim projecting from the periphery thereof, hoppers carrying the said drum and located upon both sides thereof, and annular flanges projecting inward from the said hoppers and partially encircling the said drum, as described.

3. The combination, with a revolving drum, of a circular hopper on each side thereof and forming a support therefor, the said hoppers having apertures in their bases, annular flanges upon the sides of the drum revolving upon the outside of the hoppers and having openings therein, and projections upon the sides of the said drum opposite the said openings and revolving within the said hoppers, as described.

4. The combination, with a revolving apertured drum, of a rim projecting from the periphery thereof, circular hoppers on each side of the said drum and having apertures in their bases, annular flanges projecting inward from the said hoppers and partially encircling the said drum, annular flanges upon the sides of the said drum revolving upon the outside of the said hoppers and having openings therein, and projections upon the sides of the drum opposite the said openings and revolving within the said hoppers, as described.

In testimony whereof I affix my signature in presence of two witnesses.

SAMUEL ELLISON CLARKSON.

Witnesses:
H. FASSIT CONARD,
ELIZA H. CLARKSON.